US010096340B2

(12) United States Patent
Alleaume et al.

(10) Patent No.: US 10,096,340 B2
(45) Date of Patent: Oct. 9, 2018

(54) METHOD FOR PROCESSING A VIDEO SCENE AND CORRESPONDING DEVICE

(71) Applicant: THOMSON LICENSING, Issy les Moulineaux (FR)

(72) Inventors: Vincent Alleaume, Pace (FR); Pierrick Jouet, Rennes (FR); Pascal Bourdon, Cisse (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 15/322,165

(22) PCT Filed: Apr. 9, 2015

(86) PCT No.: PCT/EP2015/057729
§ 371 (c)(1),
(2) Date: Dec. 26, 2016

(87) PCT Pub. No.: WO2015/197216
PCT Pub. Date: Dec. 30, 2015

(65) Prior Publication Data
US 2017/0140793 A1 May 18, 2017

(30) Foreign Application Priority Data

Jun. 26, 2014 (EP) .................................... 14306008

(51) Int. Cl.
*G11B 27/036* (2006.01)
*H04N 13/122* (2018.01)
(Continued)

(52) U.S. Cl.
CPC ........ *G11B 27/036* (2013.01); *G06K 9/00201* (2013.01); *G06K 9/6212* (2013.01);
(Continued)

(58) Field of Classification Search
CPC .. G11B 27/036; G06K 9/00201; G06T 19/20; H04N 13/0018
See application file for complete search history.

(56) References Cited

U.S. PATENT DOCUMENTS 8,812,272 B2 * 8/2014 Martin .................... G06F 17/50
345/420
2004/0264777 A1 12/2004 Furuhashi et al.
(Continued)

FOREIGN PATENT DOCUMENTS

EP 2437220 4/2012
EP 2439664 4/2012
(Continued)

OTHER PUBLICATIONS

Hori et al. "Generic Object Recognition by Graph Structural Expression", 2012 IEEE International Conference on Acoustics, Speech and Signal Processing (ICASSP 2012), Kyoto, Japan, Mar. 25, 2012, pp. 1021-1024.
(Continued)

*Primary Examiner* — Mishawn Hunter
(74) *Attorney, Agent, or Firm* — Jeffrey M. Navon

(57) ABSTRACT

The present disclosure relates to a new method to make a 3D acquisition of the video scene and to replace an object of the video scene by a substitute object corresponding to the product having substantially common 3D features than the object to be replaced and acceptable criteria values. It permits to minimize the appearance of hidden surfaces or occlusions.

22 Claims, 3 Drawing Sheets

(51) Int. Cl.
G06K 9/00 (2006.01)
G06T 19/20 (2011.01)
H04N 21/81 (2011.01)
H04N 13/00 (2018.01)
G06K 9/62 (2006.01)
G06Q 30/02 (2012.01)

(52) U.S. Cl.
CPC ......... *G06T 19/20* (2013.01); *H04N 13/0018* (2013.01); *H04N 13/122* (2018.05); *H04N 21/81* (2013.01); *H04N 21/816* (2013.01); *G06Q 30/0241* (2013.01); *G06T 2219/2004* (2013.01)

(56) References Cited

U.S. PATENT DOCUMENTS

| | | | |
|---|---|---|---|
| 2008/0033812 A1 | 2/2008 | McKenna et al. | |
| 2009/0305204 A1* | 12/2009 | Connolly | G09B 5/06 434/219 |
| 2010/0122286 A1 | 5/2010 | Begeja et al. | |
| 2011/0321086 A1 | 12/2011 | Buchheit et al. | |
| 2012/0078587 A1* | 3/2012 | Martin | G06F 17/50 703/1 |
| 2012/0263154 A1* | 10/2012 | Blanchflower | G06F 17/30247 370/338 |
| 2013/0141530 A1 | 6/2013 | Zavesky | |
| 2014/0016856 A1* | 1/2014 | Jiang | G06T 7/40 382/153 |
| 2015/0294094 A1* | 10/2015 | Hefeeda | G06F 21/105 726/32 |
| 2015/0332510 A1* | 11/2015 | Jovanovic | G06T 15/20 345/427 |
| 2016/0063035 A1* | 3/2016 | Rejal | G06F 17/30259 707/754 |

FOREIGN PATENT DOCUMENTS

| | | |
|---|---|---|
| EP | 2562688 | 2/2013 |
| JP | 03178719 | 6/2001 |
| KR | 2008063308 | 7/2008 |
| WO | WO1991006921 | 5/1991 |
| WO | WO2007035558 | 3/2007 |

OTHER PUBLICATIONS

Sutton et al., "Function from visual analysis and physical interaction: a methodology for recognition of generic classes of objects", Image and Vision Computing, vol. 16, No. 11, Aug. 1998, pp. 745-763.

Alexandre, "3D Descriptors for Object and Category Recognition: a Comparative Evaluation", IEEE International Conference on Intelligent Robots and Systems, Vilamoura, Portugal, Oct. 7, 2012, pp. 1-6.

ISR for PCT/EP2015/057729, dated Jul. 9, 2015, pp. 1-3.

* cited by examiner

METHOD FOR PROCESSING A VIDEO SCENE AND CORRESPONDING DEVICE

This application claims the benefit, under 35 U.S.C. § 365 of International Application PCT/EP2015/057729, filed Apr. 9, 2015, which was published in accordance with PCT Article 21(2) on Dec. 30, 2015, in English, and which claims the benefit of European Patent Application No. 14306008.5, filed Jun. 26, 2014, herein incorporated by reference.

1. TECHNICAL FIELD

The present disclosure relates to the domain of video processing and more specifically to the domain of the placement or replacement of objects or products in a film.

2. TECHNICAL BACKGROUND

The film industry is showing a growing trend that is the product placement in film, as it provides a new business and new source of revenues. This product placement can be for example the placement of a bottle of a major brand of soda in a film. This operation can also consist in replacing all the bottles in the scenes of a film by other bottles. For example, all the bottles of wine can be replaced by bottles of water or soda.

In film industry using mono camera capture or 2D shooting, the object placement is typically done once in the video scene before shooting occurs. Later replacing or adding of a wanted object is also possible by post processing methods but it is quite challenging regarding potential costs it can lead, notably for placing the object in numerous video scenes throughout the whole film.

3. SUMMARY

The present disclosure proposes a new method for replacing an object from a video scene by an object to be placed. This method proposes to make a 3D acquisition of the video scene and to replace an object of the video scene by a substitute object corresponding to the product having substantially common 3D features than the object to be replaced. It permits to minimize the appearance of hidden surfaces or occlusions.

More specifically, the present disclosure concerns a method for processing a video of a scene, the method comprising:
  receiving a 3D representation of the scene,
  determining into said 3D representation at least one candidate object, said at least one candidate object comprising a cloud of 3D points,
  computing the value of at least one criteria for at least one candidate object,
  computing a signature of the at least one candidate object, said signature being representative of 3D features of said at least one candidate object,
  determining an object to be removed and a substitute object from a plurality of candidate substitute objects of a library, each candidate substitute object having a signature, said determination being based on comparison of signatures and on candidate object criteria values, and
  replacing the object to be removed by said substitute object into said video scene.

In a specific embodiment, the value of at least one criteria for at least one candidate object is determined by a user.

Advantageously, said at least one criteria is chosen from:
  its geographical position in the video scene;
  its localisation into the foreground of the video scene;
  its visibility duration in the video scene.

The purpose of these criteria is to improve, after the replacement step, the visibility of the substitute object in the final scene.

In a specific embodiment, the library comprises a plurality of candidate substitute objects classified into object families and the substitute object is determined among candidate substitute objects belonging to at least one selected object families.

In a specific embodiment, the selected object families are chosen by a user.

In a specific embodiment, the signature of each object comprises 3D features representative of the geometry of the object, called geometrical features, and/or 3D features representative of the viewpoint of the object, called viewpoint features.

In a specific embodiment, the signature of an object is at least one histogram among the group of following histograms:
  Viewpoint Feature Histogram or VFH;
  Clustered Viewpoint Feature Histogram or CVFH;
  Point Feature Histogram or PFH;
  Fast Point Feature Histogram or FPFH.

In a specific embodiment, the substitute object is determined by:
  comparing the signature of a candidate object and the signatures of the candidate substitute objects of the library, and
  identifying the candidate substitute object of the library having a signature identical to or close to the signature of the candidate object according to a similarity criterion, the substitute object being the identified candidate substitute object of the library.

In another embodiment, the substitute object is generated from a combination of a plurality of candidate substitute objects. More specifically, the substitute object is generated by:
  comparing the signature of a candidate object and the signatures of the candidate substitute objects of the library, and
  identifying a plurality of candidate substitute objects of the library having a signature close to the signature of the candidate object according to a similarity criterion, the substitute object being a combination of the plurality of the identified candidate substitute objects of the library.

In a specific embodiment, the method further comprises a step of computing the signatures of the candidate substitute objects of the library before comparing them to the signature of a candidate object.

In a variant, the signatures of the candidate substitute objects of the library are pre-computed and stored in the library.

In a specific embodiment, before computing the signature of a candidate object and the signatures of the candidate substitute objects of the library, the method further comprises a step for filtering the candidate object and/or the candidate substitute objects of the library in order that the candidate object and the candidate substitute objects of the library have substantially the same point density.

The present disclosure concerns also a device for processing a video of a scene, the device comprising:
  an interface configured for receiving a 3D representation of the scene, and a processing unit for determining into said 3D representation at least one candidate object, said at least one candidate object comprising a cloud of 3D points, for computing the value of at least one criteria for said at least one candidate object, for computing a signature of said at least one candidate object, said signature being representative of 3D features of said at least one candidate object, for determining an object to be removed and a substitute object from a plurality of candidate substitute objects of a library, each candidate substitute object having a signature, said determination being based on comparison of signatures and on candidate object criteria values, and for replacing the object to be removed by said substitute object into said video scene.

The present disclosure also relates to a computer program product comprising instructions of program code for execution by at least one processor to perform the above mentioned method, when the program is executed on a computer.

4. LIST OF FIGURES

The present disclosure will be better understood, and other specific features and advantages will emerge upon reading the following description, the description making reference to the annexed drawings wherein.

5. DETAILED DESCRIPTION OF EMBODIMENTS

The inventive method proposes to make a 3D acquisition of the video scene to be processed and to replace an object of this scene by a substitute object having substantially the same 3D features.

Figure 1:
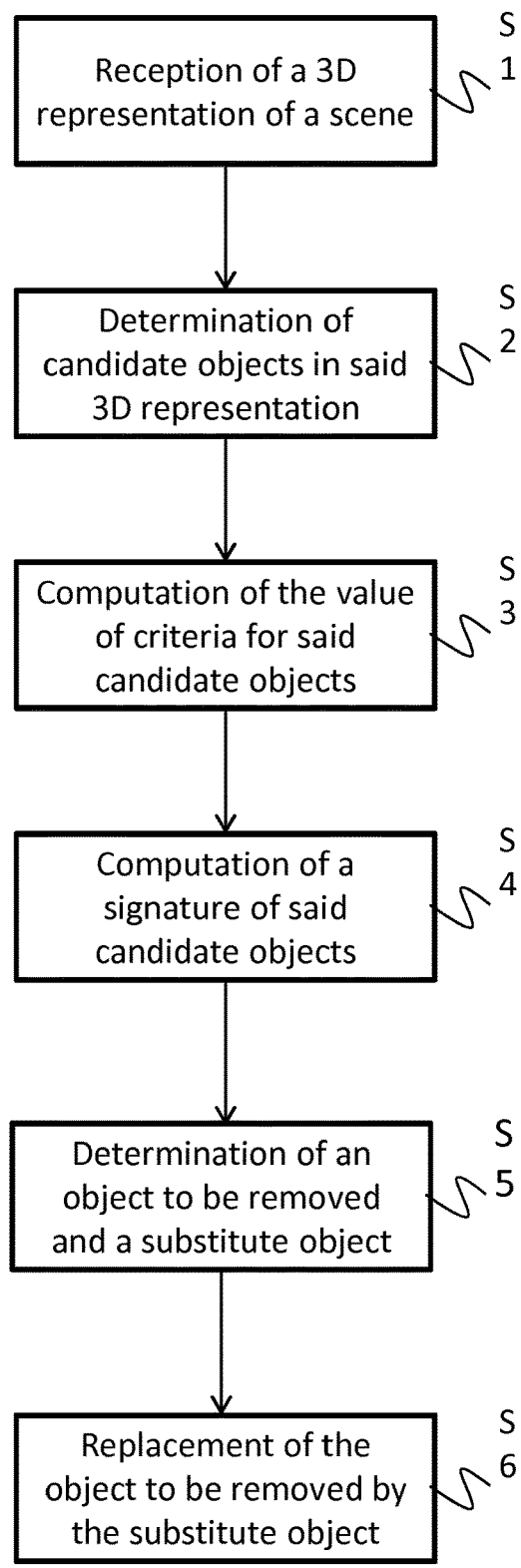
FIG. 1 shows a flow diagram of the steps of the method according to the present disclosure.

FIG. 1 shows the different steps of a method according to the present disclosure. A first step, called S1, is to receive a 3D representation of the scene. The 3D representation may be performed through an acquisition of the scene. This acquisition can be made by a 3D or stereo camera or by an arrangement comprising a 2D camera and a laser scanner. According to a variant, the 3D representation is received from a network, like internet, where 3D data are available In a second step, called S2, the 3D representation of the scene is segmented in order to obtain a plurality of candidate objects to be replaced. Each candidate object is a cloud of 3D points. A common approach of the segmentation operation consists in doing the following steps:

- detecting planes in the 3D scene using for example a RANSAC (for Random Sample Consensus) algorithm;
- removing all points belonging to at least of a part these planes, for example large planes corresponding to walls; and
- Clustering the remaining points using for instance a criterion based on euclidian distance between set of points; Sets of points above a threshold distance are considered as distinct objects.

At the end of the step S2, a plurality of candidate objects in the scene have been determined. For an indoor scene, the candidate objects are for example furniture like a table or chairs, and decorative items like a vase or a bottle.

In a third step, called S3, the impact, when replacing a candidate object, determined at step S2, by a substitute object, is evaluated. More precisely, the impact of an area, currently occupied by a candidate object varies depending from various characteristics of its area, such as in non limitative examples, the size, the visibility duration in the scene, whether it is occluded or not by other objects. This evaluation can be made by a user through an interface. In this case a user allocates a value to a criteria for each candidate object determined at step S2.

Advantageously, a value for a candidate object is computed as a function of its geographical position in the video scene and/or its localisation into the foreground or background of the video scene. For example areas located in the centre of the display, and in the foreground are more interesting for product placement applications than areas located in the background and/or in a corner of the display, as the product that will be placed in that area will have more visibility. Advantageously, when the value of at least one criteria for a particular candidate object is significantly higher than the value computed for other candidate objects, the particular object is selected as the single candidate object. In a variant, a value for a candidate object is computed as a function of the duration of its presence in the video scene. A product placement is more interesting for an object that is visible for a longer period as there are more chances it will impact a user, than another object that is visible for shorter period of time. Advantageously, for a candidate object a value of multiple criteria is computed, comprising its geographical position in the video scene, its localisation into the foreground or background of the video scene, its visibility duration in the video scene.

In a specific embodiment, a value of at least one criteria is computed for each of determined candidate objects at step S2 in any of its variant. In case for example several candidate objects have more or less similar localisation in the foreground, it is advantageous to select multiple candidate objects and keep multiple candidates for the product placement. In another example, a first candidate object is in the foreground but its visibility duration is shorter than a second candidate object, being located in the background. It is also advantageous to select both candidate objects and keep them as selected candidate objects to be removed. Advantageously, at least one candidate object to be removed is selected together with its corresponding criteria value (i.e. visibility duration, localisation, . . . ), allowing further evaluation/ranking against other factor.

In a fourth step, called S4, a 3D signature of the at least one selected candidate object is computed. The computed signature is representative of 3D features of the object. Advantageously, the signature of the object comprises 3D features representative of the geometry of the object, called geometrical features, and/or 3D features representative of the viewpoint of the object, called viewpoint features. The geometrical features are related to the shape of the object, for example the presence of edges or planes in the object. The viewpoint features comprise for example the angle and/or distance at which the object has been shot by the capturing device.

This signature is preferably an histogram of 3D features, like for example a Viewpoint Feature Histogram (VFH), a Clustered Viewpoint Feature Histogram (CVFH), a Point Feature Histogram (PFH) or a Fast Point Feature Histogram (FPFH). These histograms are described in various documents and notably in the document "3D descriptors for Object and Category Recognition: a Comparative Evaluation" of Luis A. Alexandre.

Figure 2:
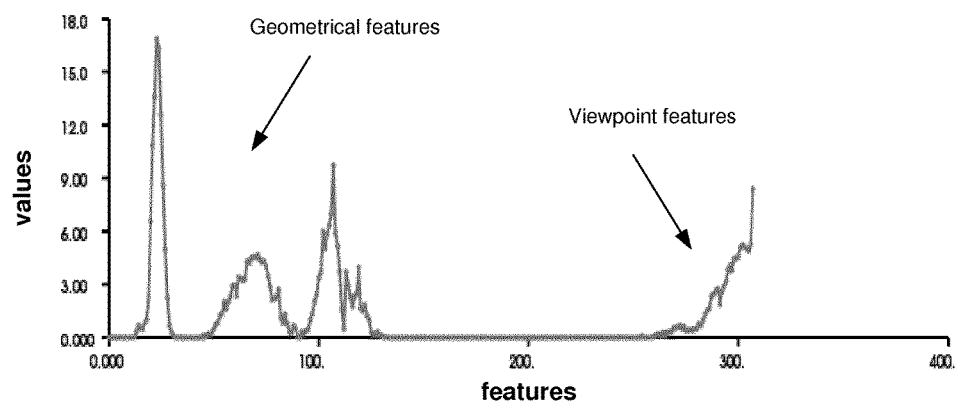
FIG. 2 shows a first histogram as a signature for objects to be removed or to be inserted in a video scene according to a particular embodiment of the present disclosure.

An example of Viewpoint Feature Histogram (VFH) is given by FIG. 2. In this histogram, a value (vertical axis) is computed for a plurality of 3D features (horizontal axis). In this histogram, the left part of the histogram values is related to geometrical features and the right part is related to viewpoint features.

The signature comprises all of these values or a part of them. The signature can comprise geometrical and viewpoint features values or only a part of them or only geometrical features values or only viewpoint features values.

In a specific embodiment, colour information of the object is also integrated into the signature.

Figure 3:
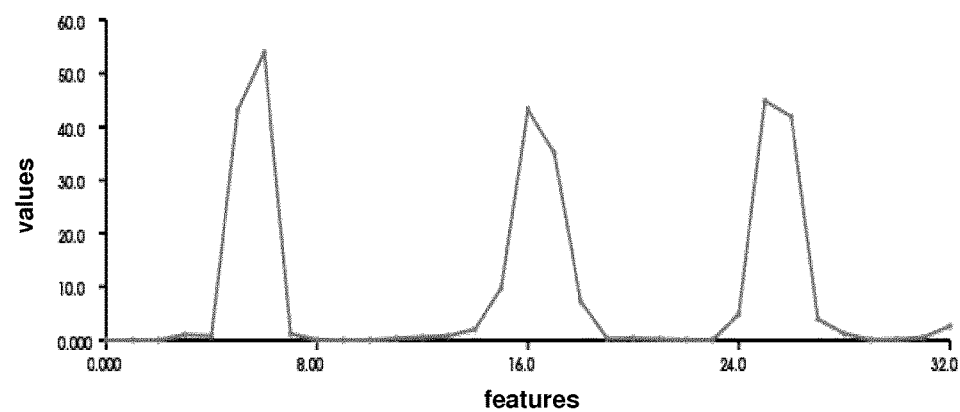
FIG. 3 shows a second histogram as a signature for objects to be removed or to be inserted in a video scene according to a particular embodiment of the present disclosure.

FIG. 3 shows a Fast Point Feature Histogram (FPFH), which is another example of histogram that can be used as a signature for the objects.

In a fifth step, called S5, a substitute object is determined from a plurality of candidate substitute objects of a library. The candidate substitute objects are preferably classified into object families within the library. Object families for indoor scenes are for example: bottles, furniture, books, boxes . . . .

A signature is computed for each of these candidate substitute objects. This signature can be pre-computed and stored in the library. In a variant, the signature of the candidate substitute objects is computed later in the process in order to take into consideration the probable difference of point density between the point cloud of the at least one candidate and the point cloud of the candidate substitute objects.

The determination step S5 is based on comparison of signatures and criteria values. In a first variant, a single candidate object is selected and the signature of the single candidate object is compared to the signatures of the candidate substitute objects of the library. The candidate substitute object having a signature identical to or close to the signature of the single candidate object according to a similarity criterion is selected. A distance between the signature of the single candidate object and the signature of each candidate substitute objects is computed and the candidate substitute object whose signature has the smallest distance with the signature of the single candidate object is selected as the substitute object of the object to be removed.

In a second variant, there are more than a single selected candidate object, because for example several candidate objects have similar criteria values. In this variant, the signatures of the selected candidate objects are compared to the signatures of the candidate substitute objects of the library, according to a similarity criteria, for example the distance between the signatures. The candidate objects to be removed are also evaluated against themselves with regard to their criteria values (for instance central geographic foreground localisation, visibility duration). In other words, the impact of the various candidate areas is also evaluated, in addition to the signature match with a candidate substitute object. A pair of candidate object to be removed and candidate substitute object is selected when it provides the best compromise between having a high criteria value, and having a small signature distance between themselves.

In a variant, the substitute object is a combination of the closest candidate substitute objects. For example, the substitute object is generated based on the two candidate substitute objects whose signature has the smallest distance with the signature of the object to be removed.

In a specific embodiment, before comparing the signatures, step S5 proposes through a user interface to select an object family of the library in order to reduce the number of comparisons to be carried out and reduce the processing time of the step S5. This selection can also be done for business reasons. The selected object families are those comprising objects of a client. The user may select through the user interface the object families corresponding to the object selected at step S3. For example, if the object selected at step S3 is a bottle, the user will select the object families corresponding to bottles. The user may also select an object family that does not correspond to the object selected at step S3. The user may want to replace bottles by books. In that case, the user will select the object family comprising books and the inventive method will select a book having the most similar 3D features with the bottle selected at step S3.

In an advantageous embodiment, the point density of the point cloud of the at least one candidate object and the point density of point cloud of the candidate substitute objects of the library are compared. If these point densities are different, a filtering step is applied to the point cloud of the at least one candidate object or to the point cloud of the candidate substitute objects in order to compare (in step S5) objects having the same or substantially the same point density. If the point density of the candidate substitute objects is higher than that of the at least one candidate object, the point density of the candidate substitute objects is reduced to be substantially equal to the point density of the at least one candidate object. This is often the case. In the same manner, if the point density of the at least one candidate object is higher than that of the candidate substitute objects, the point density of the at least one candidate object is reduced to be substantially equal to the point density of the candidate substitute objects.

This filtering step is done before the signature of the candidate substitute objects and the signature of the at least one candidate object are computed in order that it be computed with the same point densities.

In a final step, called S6, the object to be removed is replaced into the video scene by the substitute object determined at step S5.

Figure 4:
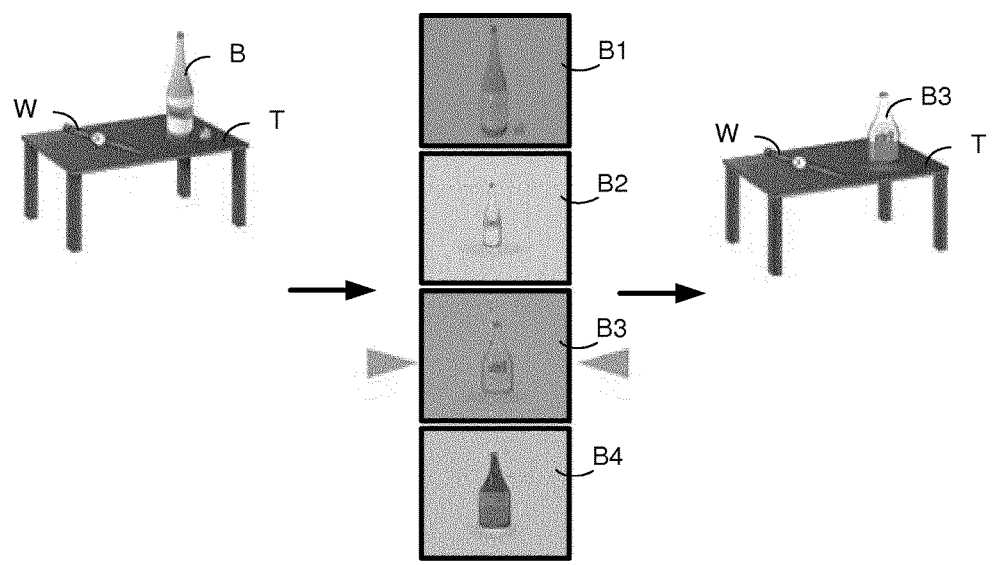
FIG. 4 shows a video scene before and after implementation of the method according to present disclosure.

If occlusions appear after the replacement step S6, inpainting operations are made in order to fill these occlusions. The inpainting process can efficiently take benefit of 3D information of that scene issued from the preceding steps:

The principle of the inventive method is illustrated through an example of application illustrated by FIG. 4. In this application, it is proposed to replace all the bottles in a scene by water bottles of a client. Different candidate substitute bottles of the client are stored in a library. These candidate substitute bottles correspond to different bottles of different shapes or different sizes of the client.

The scene to be processed is shown on left side of FIG. 4. This scene comprises a watch W and a bottle B put on a table T. The replacement of the bottle B by a client bottle according to the present disclosure is now detailed.

In the step S1, a 3D representation of the scene to be processed is acquired. In the step S2, this 3D representation is segmented into objects. In the present case, 3 objects are found in the scene: the table T, the watch W and the bottle B. In step S3, the bottle B is selected as the object to be removed or to be replaced. In step S4, a histogram based signature is computed for the bottle B. In step S5, a substitute bottle is determined among the client's bottles B1, B2, B3 and B4 stored in the library. These four bottles are shown in the middle part of FIG. 4. In this step, the signatures, pre-computed or not, of the bottles B1 to B4 are compared to the signature of the bottle B and the bottle B3 is considered as being the more appropriate in terms of 3D features to replace the bottle B. In step S6, the bottle B is replaced by bottle B3 in the scene. The final scene is shown on right side of FIG. 4

This example illustrates the processing of a video scene at a given time in a film or a video game. Of course, this replacement operation is preferably applied to the scene at different times if needed. The replacement of object points could also be done once, if the scene remains static with respect to the observing viewpoint.

Figure 5:
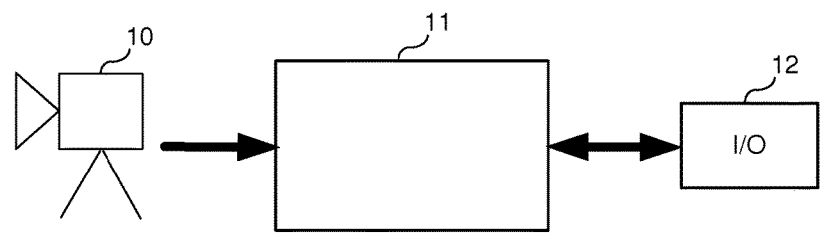
FIG. 5 shows a device for implementing the method of the present disclosure.

FIG. 5 schematically illustrates an example of a hardware embodiment of a device 11 arranged for implementing the method of the present disclosure.

This hardware embodiment comprise a 3D capturing device 10, such a 3D camera or 2D camera together with a depth device (for example, a laser scanner), for acquiring the 3D representation of the scene and a processing device 11 for implementing the steps S2 to S6 of the inventive method. This processing device 11 is equipped with Input/Output devices 12, for instance a display for displaying user interfaces and intermediary or final results of the inventive processing and a keyboard or a mouse for selection operations through user interfaces.

The processing device may comprise
a microprocessor or CPU
a graphics board including:
    a plurality of graphics processors (or GPUs);
    a Graphical Random Access Memory (or GRAM);
a Read Only Memory (ROM);
an interface configured to receive and/or transmit data; and
a Random Access Memory (RAM).

The devices 10, 12 and the different components within the device 11 may be interconnected by an address and data bus.

The process of the present disclosure is expected to be done after scene capture by the capturing device 10. But, according to a variant, the 3D data of the scene may be provided by/received from a network, like internet, where 3D data are available.

Naturally, the present disclosure is not limited to the embodiments previously described.

The implementations described herein may be implemented in, for example, a method or a process, an apparatus or a software program. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with video editing.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A device comprising:
    a network interface configured for receiving a 3D representation of a scene, and
    a processing unit for determining into said 3D representation at least two candidate objects, for computing a value of at least one criteria for each of said at least two candidate objects, for computing a signature of each of said at least two candidate objects, said signature being representative of 3D features of each of said at least two candidate objects, for automatically determining an object to be removed and a substitute object from a plurality of candidate substitute objects of a library, each candidate substitute object having a signature, said automatic determination being based on comparison of signatures and on the candidate object criteria values, and for processing a video of the scene by replacing the object to be removed by said substitute object into said video of the scene.

2. The device according to claim 1, wherein the values of at least one criteria for the at least two candidate objects are determined by a user.

3. The device according to claim 1 wherein the at least one criteria is chosen from:
    a geographical position of said object in the video of the scene;

a localisation of said object into the foreground of the video of the scene;

a visibility duration of said object in the video of the scene.

4. The device according to claim 1, wherein the values of at least one criteria for the at least two candidate objects are determined by a user.

5. The device according to claim 1 wherein the at least one criteria is chosen from:

a geographical position of said object in the video of the scene;

a localisation of said object into the foreground of the video of the scene;

a visibility duration of said object in the video of the scene.

6. The device according to claim 1, wherein said at least one candidate object comprises a cloud of 3D points.

7. The device according to claim 1, wherein in the library comprising a plurality of candidate substitute objects classified into object families, the substitute object is determined among candidate substitute objects belonging to at least one selected object families.

8. The device according to claim 7, wherein the selected object families are chosen by a user.

9. The device according to claim 1, wherein the signature of each object comprises 3D features representative of the geometry of the object, called geometrical features, or 3D features representative of the viewpoint of the object, called viewpoint features.

10. The device according to claim 9, wherein the signature of an object is at least one histogram among the group of following histograms:

A Viewpoint Feature Histogram;

A Clustered Viewpoint Feature Histogram;

A Point Feature Histogram;

A Fast Point Feature Histogram.

11. The device according to claim 10, wherein the processing unit is further configured to compute the signatures of the candidate substitute objects of the library.

12. The device according to claim 1, wherein the substitute object is determined by:

comparing the signatures of the at least two candidate objects with the signatures of the candidate substitute objects of the library;

comparing the candidate object criteria values of the at least two candidate objects, and identifying the candidate substitute object of the library having a signature identical to or close to the signature of one of the at least two candidate objects, the criteria value of said one of the at least two candidate objects being higher than the criteria value of any other of the at least two candidate objects, the substitute object being the identified candidate substitute object of the library.

13. The device according to claim 1, wherein the signatures of the candidate substitute objects of the library are pre-computed and stored in the library.

14. A device comprising a network interface configured for receiving a 3D representation of a scene, and at least one processor configured to:

determine into said 3D representation at least two candidate objects, compute a value of at least one criteria for each of said at least two candidate objects, compute a signature of each of said at least two candidate objects, said signature being representative of 3D features of each of said at least two candidate objects, automatically determine an object to be removed and a substitute object from a plurality of candidate substitute objects of a library, each candidate substitute object having a signature, said automatic determination being based on comparison of signatures and on the candidate object criteria values, and process a video of the scene by replacing the object to be removed by said substitute object into said video of the scene.

15. The device according to claim 14, wherein said at least one candidate object comprises a cloud of 3D points.

16. The device according to claim 14, wherein in the library comprising a plurality of candidate substitute objects classified into object families, the substitute object is determined among candidate substitute objects belonging to at least one selected object families.

17. The device according to claim 16, wherein the selected object families are chosen by a user.

18. The device according to claim 14, wherein the signature of each object comprises 3D features representative of the geometry of the object, called geometrical features, or 3D features representative of the viewpoint of the object, called viewpoint features.

19. The device according to claim 18, wherein the signature of an object is at least one histogram among the group of following histograms:

A Viewpoint Feature Histogram;

A Clustered Viewpoint Feature Histogram;

A Point Feature Histogram;

A Fast Point Feature Histogram.

20. The device according to claim 19, wherein the processor is further configured to compute the signatures of the candidate substitute objects of the library.

21. The device according to claim 14, wherein the substitute object is determined by:

comparing the signatures of the at least two candidate objects with the signatures of the candidate substitute objects of the library;

comparing the candidate object criteria values of the at least two candidate objects, and identifying the candidate substitute object of the library having a signature identical to or close to the signature of one of the at least two candidate objects, the criteria value of said one of the at least two candidate objects being higher than the criteria value of any other of the at least two candidate objects, the substitute object being the identified candidate substitute object of the library.

22. The device according to claim 14, wherein the signatures of the candidate substitute objects of the library are pre-computed and stored in the library.

* * * * *